United States Patent [19]

Kohrn et al.

[11] 4,266,304
[45] May 12, 1981

[54] FLUSH TANK WATER SAVER

[76] Inventors: Edward L. Kohrn, 9 Sunset Dr., Cape Arthur, Severna Park, Md. 21146; Seymour Globus, 268 Wakely Ter., Bel Air, Md. 21024

[21] Appl. No.: 42,218

[22] Filed: May 24, 1979

[51] Int. Cl.³ .......................... E03D 1/00; A47K 17/00
[52] U.S. Cl. ............................................. 4/415; 4/395; 4/353; 137/423
[58] Field of Search .................. 137/409, 423, 434; 4/415, 395, 394, 353

[56] References Cited
U.S. PATENT DOCUMENTS
3,387,308 6/1968 Capra ................................ 137/423

Primary Examiner—William D. Martin, Jr.
Attorney, Agent, or Firm—Larson and Taylor

[57] ABSTRACT

A water-saving device for use in flush toilets including a water tank in which the water level is held at a predetermined level by a float valve controlled by a ball float, said water-saving device comprising a bouyant unitary member comprised of a tapered portion and a side portion integral with projecting laterally from one side of said tapered portion, said taper portion and side portion jointly forming a concave section for receipt of said ball float, the length of said concave section being over half but less than the entire length of said ball float, means for attaching said device to said ball float and means extending peripherally around said side portion for receipt of said attaching means.

4 Claims, 6 Drawing Figures

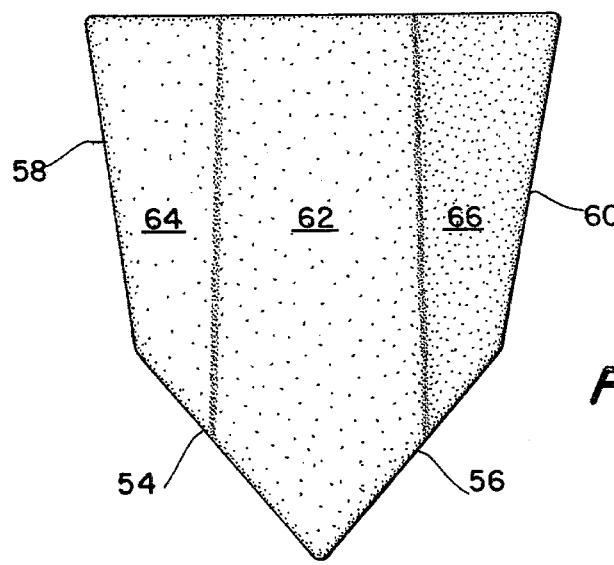
FIG. 4
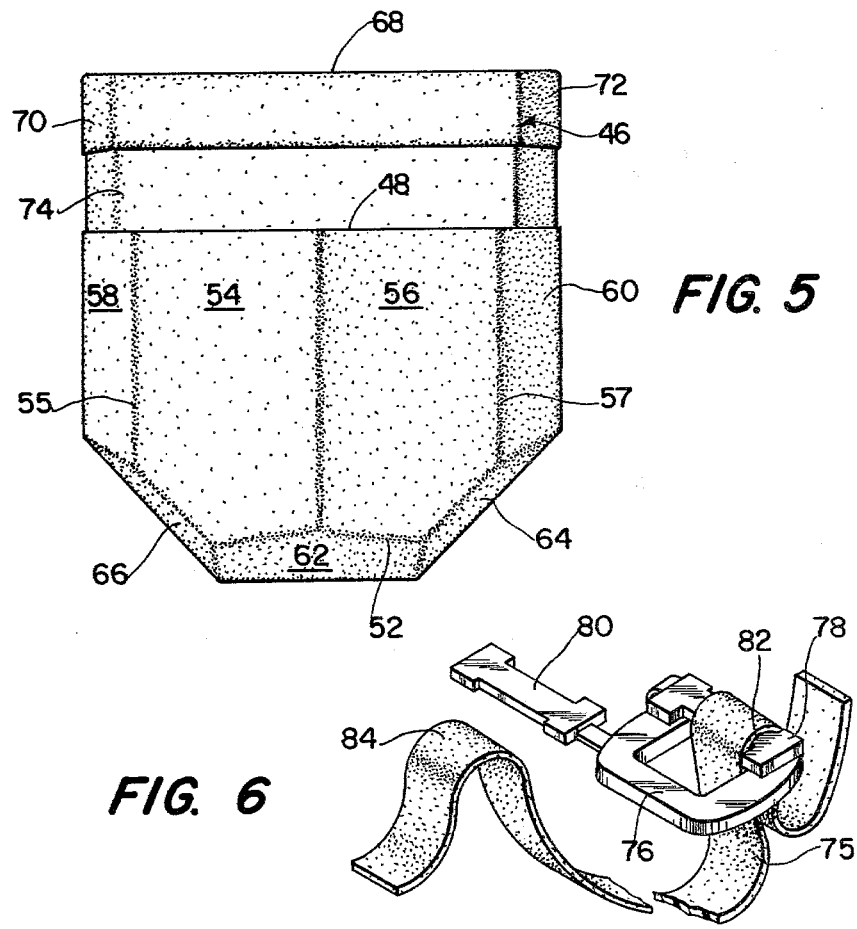
FIG. 5
FIG. 6

FLUSH TANK WATER SAVER

BACKGROUND OF THE INVENTION

1. Field of the Invention

This invention relates to water closets and more particularly to a water-saving attachment which when secured to the ball float of a toilet, reduces substantially the amount of water used in the flushing of the toilet.

2. Brief Description of the Prior Art

A conventional form of flush toilet presently in wide use basically includes a bowl portion and a water-dispensing tank disposed above the bowl. The tank is provided with an inlet conduit coupled to a pressurized source of fresh water. A valve mechanism is connected to the inlet conduit to automatically maintain the tank supplied with a charge of fresh water. Situated at the bottom of the tank is a valid discharge opening which, when uncovered, admits water from the tank to the bowl to flush the latter. Many toilets of this type are designed to discharge as must as from five to seven gallons of water per flush. It is recognized, however, that less than this amount of water, perhaps only one-half as much, is actually required for the toilet to flush properly. It will thus be realized that large quantities of fresh water can and are being wasted by the use of these types of flush toilets.

Heretofore, various proposals have been made for conserving waterdischarged from a flush toilet. These proposals include, for instance, inserting various devices or units around the discharge opening of a flush toilet for the purpose of retaining within the tank a portion of the water which would otherwise be discharged from the toilet during a flushing operation. Unfortunately, these types of structures are not without their shortcomings for it is difficult to install such units around the plumbing and flushing equipment located within the toilet tank and maintain a tight seal between the bottom edges of the unit and the bottom of the tank.

Another age old method of attempting to conserve water in the flushing operation involves inserting in the toilet tank water-displacing objects such as bricks. This solution has not been widely accepted nor is it recommended by toilet manufacturers and plumbers since bricks tend to partially disintegrate and form silt which destroys washers and seals and adversely effects other parts of the flushing equipment. In addition, bricks have been known to shift position and interfere with the flushing equipment.

It is, therefore, an object of the invention to eliminate or minimiuze the problems presented by the water-conserving devices and methods previously discussed.

Another object of the present invention is to provide a simple and inexpensive device which can be removably installed with ease in the water tank of existing flush toilets of the ball float type.

Yet another object of the invention is to provide a novel device which when installed in conventional toilet tanks does not disturb the flow pattern in the tank and does not interfere in anyway with the flushing equipment.

Another object of the invention is to provide a device that accomodates virtually all commercial tanks and has a design that offers excellent clearance during flushing regardless of the type of ball, tank or mechanism employed.

It is a further object of the invention to provide a device which when installed in conventional 4 to 5 gallon toilet tanks saves upwards to two gallons per flush.

SUMMARY OF THE INVENTION

These and other objects of the invention are obtained by a water saving device for use in flush toilets including a water tank in which the water level is held at a predetermined level by a float valve controlled by a ball float, said water-saving device comprising a bouyant unitary member comprised of a tapered portion and a slide portion integral with and projecting laterally from one side of said tapered portion, said taper portion and side portion jointly forming a concave section for receipt of said ball float, the length of said concave section being over half but less than the entire length of said ball float, means for attaching said device to said ball float and means extending peripherally around said side portion for receipt of said attaching means.

BRIEF DESCRIPTION OF THE DRAWING

Other objects and advantages of the invention will become apparent from the subsequent detailed description thereof in connection with the accompanying drawings in which like numerals designate like elements and in which:

FIG. 4 is a rear elevational view of the water-saving device of the invention;

FIG. 5 is a bottom plan view of the water-saving device of the invention;

FIG. 6 is a perspective view of a belt means for attaching the water-saving device to the ball float.

DETAILED DESCRIPTION OF THE INVENTION

Figure 1:
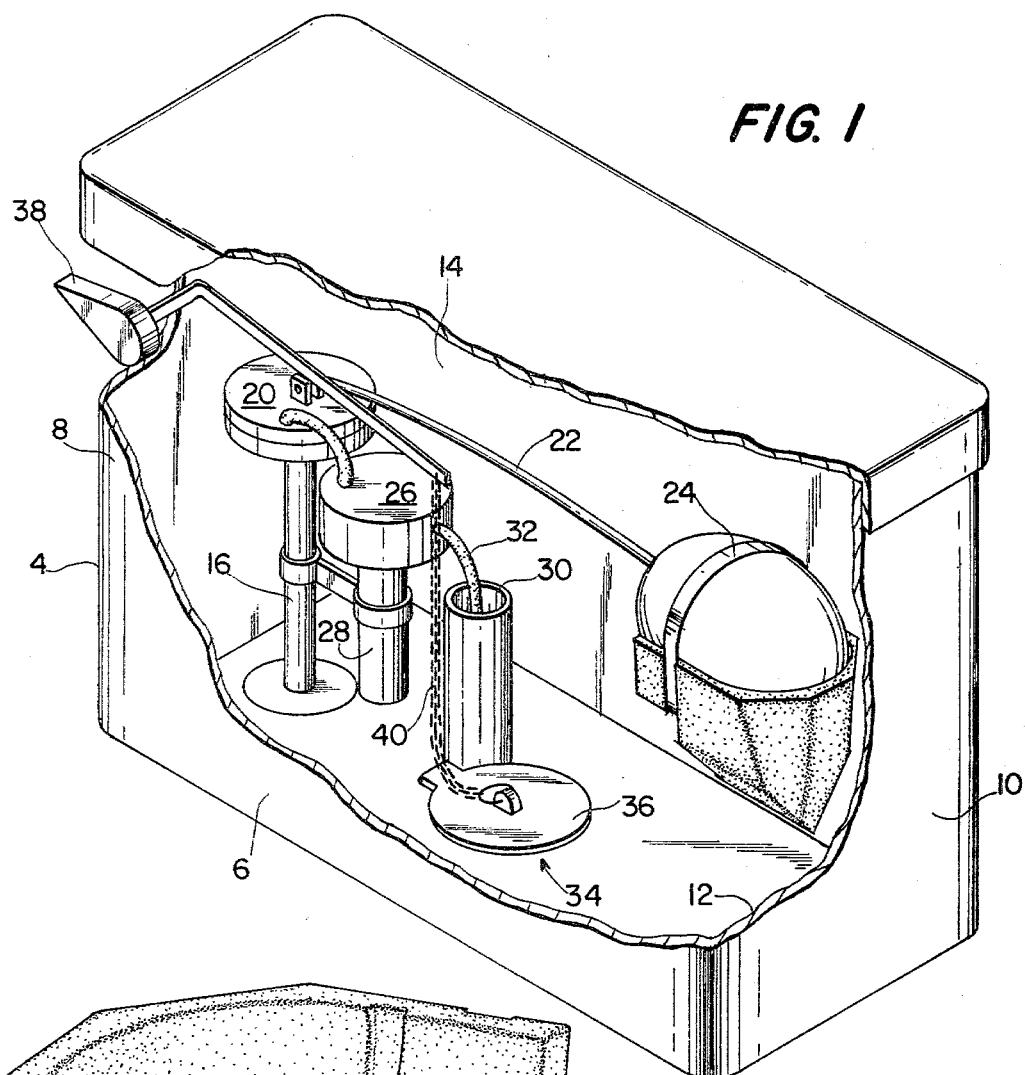
FIG. 1 is a perspective view of a flush toilet tank having portions broken away to show the water-saving device attached to the ball float.
Figure 2:
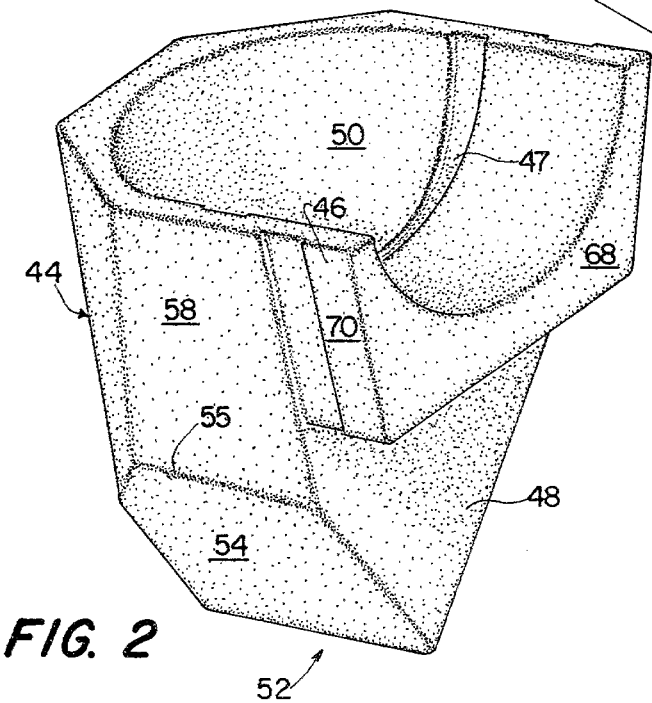
FIG. 2 is a perspective view of the water-saving device.
Figure 3:
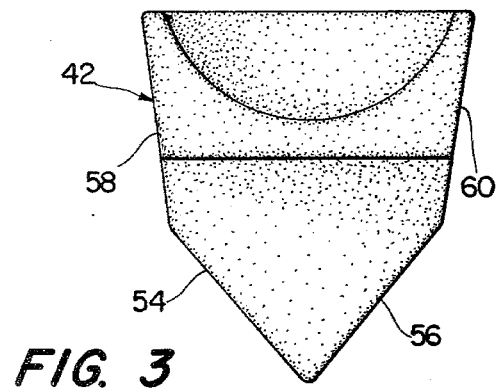
FIG. 3 is a front elevational view of the water-saving device of the invention.

The water-saving device will be described in conjunction with a conventional flush type toilet having a water tank 4 that includes a floor 6, a pair of opposed side walls 8 and 10 and a pair of opposed front and rear walls 12 and 14, respectively.

Within the water tank 4 is mounted a vertical pipe 16 which communicates with an external supply conduit (not shown). An inlet valve 20 is disposed atop the inlet water pipe 16 and is operated by an actuating arm 22 to which is attached a float 24 in the conventional manner to regulate the inflow of fresh water into the tank.

A water-distributing element 26 is connected to the inlet valve 20 and distributes incoming water to both a chamber filler tube 28 and an overflow tube 30. The overflow tube is connected at its base to the tank floor and communicates with the distributing element via an overflow conduit 32.

In the tank floor 6 is located a discharge opening 34 which communicates the tank 4 with the toilet bowl (not shown). An outlet valve assembly 34 is operably connected to a handle 38 by means of a chain 40. The handle 38 is operable to pivot the outlet valve assembly from a closed position shown in FIG. 1, to an open position that allows water to flow through the discharge opening 34.

The conventional tank and flushing equipment described operates in a well-known fashion. When the valve asembly 26 is in a closed position the inlet valve 20 is operable to supply a predetermined amount of water into the tank. The handle 38 is operable by means of chain 40 to pivot the outlet valve assembly 36 to an open position which allows substantially all the water in the tank 4 to flow out through discharge opening 34 to the toilet bowl.

In accordance with the present invention, a novel water-saving device 42 is attached to the ball float 24 which substantially reduces the amount of water that flows into and necessarily out of the tank during each flushing operation. Referring to FIGS. 2–5, the water-saving device 42 is a bouyant unitary member comprised of a tapered portion, indicated generally as 44, and a side portion indicated generally as 46, integral with and projecting laterally from the side 48 of the tapered portion 44.

The water-saving device 42 can be constructed of any suitable bouyant material such as cork, foamed plastic and the like or it can be a hollow unitary member possessing the required bouyancy. The preferred construction material is foamed polystyrene.

The tapered portion 44 and the side portion 46 together form a concave section 50 adapted to receive the ball float. The length of the concave section 50 may vary but in any case is over half but less than the entire length of the ball float. Advantageously, the concave section 50 is provided with a centrally-located groove 74 to accomodate ball floats of the type containing a central at which two halves of the ball float are joined.

The tapered portion 44 contains a wedge section, indicated generally as 52, made up of wedge sides 54 and 56 which are integral with side sections 58 and 60, respectively. The side sections 58 and 60 each preferably taper away from the edges 55 and 57.

The front of the water-saving device is comprised of a central panel 62, flanked by two side panels 64 and 66 each of which tapers rearwardly away from central panel 62.

The projecting side portion 46 contains a face 68, sides 70 and 72 situated in the same planes as sides 58 and 60, respectively. A groove 74 is provided peripherally around side portion 46 adjacent tapered portion 44 for receipt of means for attaching the water-saving device to the ball float. Any suitable attaching means can be used, as for instance, belt means, elastic bands and the like or a combination thereof. A preferred belt means is shown in FIG. 5 which will be described below. The top of the laterally projecting side portion 46, as aforementioned, constitutes part of concave section 50.

Installation of the water-saving device is accomplished simply by laying the ball float 24 in concave section 50, inserting the attaching means in groove 74 under water-saving device 44, then over the ball float 24 and tightly securing the two together.

Illustrative of a suitable attaching means is the belt means shown in FIG. 5. Referring to FIG. 5, the belt means contains a strap 75 and a plastic buckle 76 having integral with one of its sides two spaced apart tines 78 and 80. In a preferred method of installation, the water-saving device of the invention is inserted on the underside of ball float and held in place by a rubber band. The toilet is then flushed to be sure the ball float arm operates freely and that the water-saving device does not interfere with normal operations. When the water-saving device is in proper position, the strap shown in FIG. 5 is assembled as follows: One end of the strap 75 is folded over away from you so as to create a loop 82, preferably of about 3 inches in length. The loop is inserted into the buckle 76 and one of the tines (tines 78 in FIG. 5) is bent and inserted through the loop 82. The other end of strap 75 is folded over toward you to again create a loop 84 which is also inserted through buckle 76. Tine 80 is then bent and inserted through loop 84. The strap thus assembled is inserted under and over the properly positioned water-saving device with buckle 76 at the top of the ball float, and the strap is tightened by pulling on both free ends thereof. Once the strap is tight and the water-saving device secure, any excess ends of the strap can be cut away.

It should be clear that once attached, the water-saving device reduces the water level in the water tank significantly below its normal level, that is, the level predetermined by the height of the ball float at which the float valve is closed. Consequently, substantially less water is used with each flushing of the toilet. The precise amount of water saved will vary, of course, depending on the size of the water tank and the size of the water-saving device of the invention.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

It is claimed:

1. In a flush toilet including a water tank in which the water level is held at a predetermined level by a float valve controlled by a ball float and a bouyant water-saving device attached to said ball float, the improvement wherein said bouyant water-saving device comprises a bouyant unitary member comprised of a tapered portion having a plurality of sides and a side portion integral with and projecting laterally from one of said sides of said tapered portion, said tapered portion and said portion jointly having a concave section for receipt of said ball float, the length of said concave section being over half but less than the entire length of said ball float, said tapered portion containing a lowermost wedge section, means for attaching said device to said ball float, and means extending peripherally around said side portion for receipt of said attaching means.

2. A toilet according to claim 1 wherein a groove is provided in said concave section to accomodate the central joining rib of ball floats.

3. A toilet according to claim 1 wherein the front of the tapered device is comprised of a main panel flanked by two side panels tapered rearwardly away from said main panel.

4. A toilet according to claim 1 wherein the device is made of foamed polystyrene.

* * * * *